United States Patent
Huang et al.

(10) Patent No.: US 11,287,914 B2
(45) Date of Patent: Mar. 29, 2022

(54) TOUCH DISPLAY DEVICE

(71) Applicant: HUIZHOU CHINA STAR OPTOELECTRONICS TECHNOLOGY CO., LTD., Guangdong (CN)

(72) Inventors: Dongchen Huang, Guangdong (CN); Chingyuan Cheng, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/981,399

(22) PCT Filed: Aug. 3, 2020

(86) PCT No.: PCT/CN2020/106558
§ 371 (c)(1),
(2) Date: Sep. 16, 2020

(65) Prior Publication Data
US 2021/0397283 A1 Dec. 23, 2021

(30) Foreign Application Priority Data
Jun. 19, 2020 (CN) .......................... 202010565388.5

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
USPC .................................................. 345/173, 174
See application file for complete search history.

(56) References Cited

U.S. PATENT DOCUMENTS

| | | | | |
|---|---|---|---|---|
| 2002/0180712 A1* | 12/2002 | Sato | ......................... | G09F 13/04 345/173 |
| 2008/0068342 A1* | 3/2008 | Chang | ................... | G06F 3/0412 345/173 |
| 2012/0319976 A1* | 12/2012 | Ahn | ........................ | G06F 3/045 345/173 |
| 2015/0370391 A1* | 12/2015 | Chen | ...................... | G06F 3/0412 345/173 |
| 2019/0346714 A1* | 11/2019 | Chen | .................. | G02F 1/133502 |

* cited by examiner

*Primary Examiner* — Deeprose Subedi (57) ABSTRACT

A touch display device is disclosed, including a display panel and a touch layer, a sealant disposed between the touch layer and the display panel, the sealant, the touch layer, and the display panel forming a sealed cavity. An air pressure intensity inside the sealed cavity is less than a preset value.

19 Claims, 6 Drawing Sheets

TOUCH DISPLAY DEVICE

BACKGROUND OF INVENTION

Field of Invention

This application relates to technical field of displays, and particularly relates to a touch display device.

Description of Prior Art

Currently, in touch display devices, a touch layer and a display panel are generally connected by air gap bonding or optical bonding. As to large-size display panels, in order to reduce production costs, air gap bonding is mostly applied in connection of the touch layer and the display panel in this industry.

However, when the touch layer is connected to the display panel by air gap bonding, during use of the touch display device, it is difficult to keep gap sizes between the touch layer and the display panel constant, therefore, touch signals of the touch layer become unstable, resulting in reduction of touch sensitivity.

In conventional touch display devices, the touch layer is connected to the display panel by air gap bonding, it is difficult to keep the gap sizes between the touch layer and the display panel constant, therefore, touch signals of the touch layer become unstable, resulting in the reduction of touch sensitivity.

SUMMARY OF INVENTION

In a first aspect, a touch display device is provided, wherein the touch display device comprises a display panel and a touch layer, and a sealant disposed between the touch layer and the display panel, wherein the sealant, the touch layer, and the display panel form a sealed cavity and an air pressure intensity inside the sealed cavity is less than a preset value.

In some embodiments, the display panel comprises a display screen and an encapsulation cover plate disposed on a light exiting side of the display screen, and the touch layer is disposed between the display screen and the encapsulation cover plate.

In some embodiments, the sealant and the sealed cavity are disposed between the touch layer and the encapsulation cover plate, a first adhesive layer is disposed between the touch layer and the display screen, the first adhesive layer is connected with the touch layer and the display screen, and an orthographic projection on the encapsulation cover plate of the first adhesive layer covers an orthographic projection on the encapsulation cover plate of a surface of the display screen.

In some embodiments, the sealant and the sealed cavity are disposed between the touch layer and the display screen, a second adhesive layer is disposed between the touch layer and the encapsulation cover plate, the second adhesive layer is connected with the touch layer and the encapsulation cover plate, and an orthographic projection on the encapsulation cover plate of the second adhesive layer covers an orthographic projection on the encapsulation cover plate of a surface of the touch layer.

In some embodiments, the touch layer comprises a plurality of first electrodes and a plurality of second electrodes separated from each other, and the touch layer is a self-capacitive touch layer or a mutual-capacitive touch layer.

In some embodiments, the second electrodes are disposed on a side of the display screen away from the first electrode, or the first electrodes are disposed on a same layer as the second electrodes.

In some embodiments, manufacturing materials of either the first electrodes, the second electrodes or both comprise at least one of nano silver, transparent oxide semiconductor or carbon nanotube.

In some embodiments, the touch display device further comprises an anti-glare layer disposed on the light-exiting side of the display screen.

In some embodiments, the anti-glare layer comprises an anti-glare film disposed on the touch layer, and the touch layer is disposed either on a side surface of the touch layer away from, a side surface of the touch layer near the display screen, or both.

In some embodiments, the anti-glare layer comprises a plurality of scattering particles disposed on the touch layer.

In a second aspect, a touch display device is provided, wherein the touch display device comprises a display panel and a touch layer, a sealant is disposed between the touch layer and the display panel, wherein the sealant, the touch layer and the display panel form a sealed cavity and an air pressure intensity inside the sealed cavity is less than a preset value, and a thickness of the sealant is less than 20 microns.

In some embodiments, the display panel comprises a display screen and an encapsulation cover plate disposed on a light exiting side of the display screen, and the touch layer is disposed between the display screen and the encapsulation cover plate.

In some embodiments, the sealant and the sealed cavity are disposed between the touch layer and the encapsulation cover plate, a first adhesive layer is disposed between the touch layer and the display screen, the first adhesive layer is connected with the touch layer and the display screen, and an orthographic projection on the encapsulation cover plate of the first adhesive layer covers an orthographic projection on the encapsulation cover plate of a surface of the display screen.

In some embodiments, the sealant and the sealed cavity are disposed between the touch layer and the display screen, a second adhesive layer is disposed between the touch layer and the encapsulation cover plate, the second adhesive layer is connected with the touch layer and the encapsulation cover plate, and an orthographic projection on the encapsulation cover plate of the second adhesive layer covers an orthographic projection on the encapsulation cover plate of a surface of the touch layer.

In some embodiments, the touch layer comprises a plurality of first electrodes and a plurality of second electrodes separated from each other, and the touch layer is a self-capacitive touch layer or a mutual-capacitive touch layer.

In some embodiments, the second electrodes are disposed on a side of the display screen away from the first electrode, or the first electrodes are disposed on a same layer as the second electrodes.

In some embodiments, manufacturing materials of either the first electrodes, the second electrodes or both comprise at least one of nano silver, transparent oxide semiconductor or carbon nanotube.

In some embodiments, the touch display device further comprises an anti-glare layer disposed on a light exiting side of the display screen.

In some embodiments, the anti-glare layer comprises an anti-glare film disposed on the touch layer, and the touch layer is disposed either on a side surface of the touch layer away from, a side surface of the touch layer near the display screen, or both.

In some embodiments, the anti-glare layer comprises a plurality of scattering particles disposed on the touch layer.

A pressure difference between the sealed cavity and external atmospheric pressure is utilized to decrease a gap value of the sealed cavity, at the same time, the gap value of the sealed cavity always remains constant during use of the touch display device, linearity and sensitivity of touch function of the touch display device meeting product requirements can be ensured.

BRIEF DESCRIPTION OF DRAWINGS

The technical solutions and its advantage effects of the present application will be obvious through detailed description of specific embodiments of the present application in the following with reference to the accompanying drawings.

REFERENCE NUMBERS

Display screen 10, touch layer 20, first electrode 21, second electrode 22, insulating layer 23, substrate 24, transparent film layer 25, encapsulation cover plate 30, sealant 40, sealing cavity 50, first adhesive layer 61, second adhesive layer 62, anti-glare film 71, scattering particle 72, transparent adhesive layer 80, and optical adhesive layer 90.

DETAILED DESCRIPTION OF PREFERRED EMBODIMENTS

The description of following embodiment, with reference to the accompanying drawings, is used to exemplify specific embodiments which may be carried out in the present application. The directional terms mentioned in the present application, such as "up", "down", "front", "back", "left", "right", "inside", "outside", and "side surface" etc., only refer to the directions in attached drawings. Therefore, the directional terms are used to illustrate and help understand this disclosure, but not used to limit this disclosure. In the figures, the same reference numbers are configured to represent elements with similar structures.

The present application aims to solve the technical problem that in conventional touch display devices, the touch layer is connected to the display panel by frame adhesive, wherein due to inconsistent gap sizes between the touch layer and the display panel, therefore touch signals of the touch layer become unstable, resulting in reduction of touch sensitivity.

Figure 1:
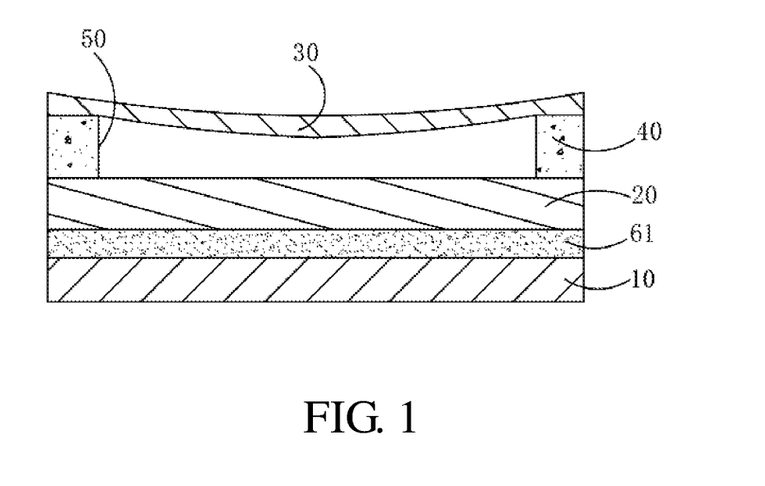
FIG. 1 is a structural schematic diagram of a first structure of a touch display device in the present application.

As shown in FIG. 1, a touch display device comprises a display panel and a touch layer 20, a sealant 40 is disposed between the touch layer 20 and the display panel, wherein the sealant 40, the touch layer 20 and the display panel form a sealed cavity 50 and an air pressure intensity inside the sealed cavity 50 is less than a preset value.

Wherein, a thickness of the sealant 40 can be less than 20 microns, an air pressure intensity inside the sealed cavity 50 can be less than 0.1 Torr, and the sealed cavity 50 can be a vacuum chamber.

It should be noted that a difference between the sealed cavity 50 and external atmospheric pressure is utilized to reduce a gap value of the sealed cavity 50, at the same time, the gap value of the sealed cavity 50 always remains constant during use of the touch display device, linearity and sensitivity of touch function of the touch display device meeting product requirements can be ensured.

Specifically, the display panel includes a display screen 10 and an encapsulation cover plate 30 disposed on a light exiting side of the display screen 10, and the touch layer 20 is disposed between the display screen 10 and the encapsulation cover plate 30.

Wherein the display screen 10 can be a liquid crystal display screen 10. The touch layer 20 can be a capacitive touch layer, a resistive touch layer, an infrared touch layer, or an optical imaging touch layer and so on. The touch layer 20 can be attached to the display screen 10 in an out-cell way. The encapsulation cover plate 30 can be a flexible transparent cover plate. The encapsulation cover plate 30 can be a transparent plastic cover plate or transparent glass cover plate. Orthographic projections of the display screen 10 and the touch layer 20 are located inside the encapsulation cover plate 30, that is to say a size of the encapsulation cover plate 30 is larger than or equal to sizes of the display screen 10 and the touch layer 20. The encapsulation cover plate 30 is configured to protect and prevent the display screen 10 and the touch layer 20 from being directly pressed, collided, or coming into contacting with water vapor.

Specifically, the sealant 40 is disposed on an edge region of the touch layer 20, and the sealant 40 is disposed around an area of the touch layer 20 corresponding to a light-emitting region of the display screen 10.

In one embodiment, the sealant 40 and the sealed cavity 50 are disposed between the touch layer 20 and the encapsulation cover plate 30, a first adhesive layer 61 is disposed between the touch layer 20 and the display screen 10, the first adhesive layer 61 is connected with the touch layer 20 and the display screen 10, and an orthographic projection on the encapsulation cover plate 30 of the first adhesive layer 61 covers an orthographic projection on the encapsulation cover plate 30 of a surface of the display screen 10.

It should be noted that the touch layer 20 is attached to the display screen 10 by optical bonding, the encapsulation cover plate 30 is attached to the touch layer 20 by air gap bonding, the sealant 40, the touch layer 20 and the encapsulation cover plate 30 form the sealed cavity 50, and under a pressure difference between the sealed cavity 50 and the external atmospheric pressure, a portion of the encapsulation cover plate 30 corresponding to the sealed cavity 50 nears the touch layer 20 so as to decrease a gap value of the sealed cavity 50.

Figure 2:
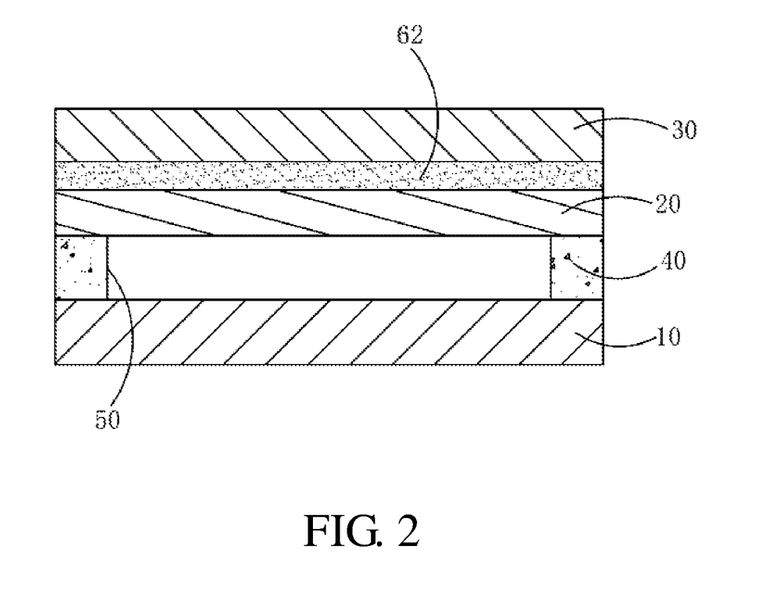
FIG. 2 is a structural schematic diagram of a second structure of the touch display device in the present application.

In another embodiment, as shown in FIG. 2, the sealant 40 and the sealed cavity 50 are disposed between the touch layer 20 and the display screen 10, a second adhesive layer 62 is disposed between the touch layer 20 and the encapsulation cover plate 30, the second adhesive layer 62 is connected with the touch layer 20 and the encapsulation cover plate 30, and an orthographic projection on the encapsulation cover plate 30 of the first adhesive layer 62 covers an orthographic projection on the encapsulation cover plate 30 of a surface of the touch layer 20.

It should be noted that the encapsulation cover plate 30 is attached to the display screen 20 by optical bonding, the touch layer 20 is attached to the touch layer 10 by air gap bonding, the sealant 40, the touch layer 20 and the display screen 10 form the sealed cavity 50, and under a pressure difference between the sealed cavity 50 and the external atmospheric pressure, a portion of the encapsulation cover plate 30 and a portion of the touch layer 20 corresponding to the sealed cavity 50 nears the display screen 10 so as to decrease a gap value of the sealed cavity 50.

Taking that the sealant 40 and the sealed cavity 50 are disposed between the touch layer 20 and the encapsulation cover plate 30 as an example, manufacturing processes of the touch display device include:

step 1: attaching the touch layer 20 to the display screen 10 using the first adhesive layer 61 in optical bonding method;

step 2: putting the encapsulation cover plate 30 and the display screen 10 in a vacuum chamber, evacuating the vacuum chamber until an air pressure intensity of the vacuum chamber is less than 0.1 Torr;

step 3: coating a sealant 40 around a profile of the touch layer 20 on an edge region of the touch layer 20 and performing a pre-curing treatment to the sealant 40 so that the sealant 40, the touch layer 20 and the encapsulation cover plate 30 form a sealed cavity 50, and an air pressure intensity inside the sealed cavity 50 is equal to an air pressure intensity of the evacuated vacuum chamber:

step 4: refilling the vacuum chamber by connecting the vacuum chamber with external atmosphere, taking out the touch display panel, under an pressure difference between the sealed cavity 50 and external atmospheric pressure, a portion of the encapsulation cover plate 30 corresponding to the sealed cavity 50 gets close to the touch layer 20 so as to decrease a gap value of the sealed cavity 50, and keep the gap value of the sealed cavity 50 a constant value.

Figure 3:
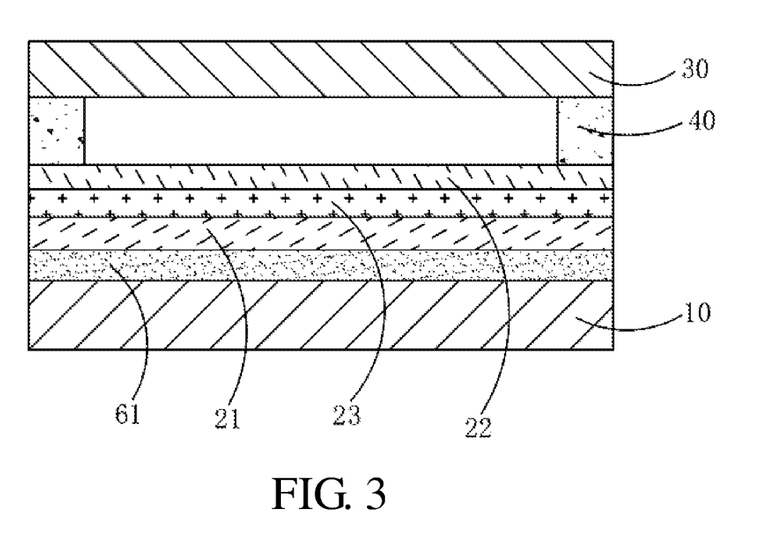
FIG. 3 is a structural schematic diagram of a third structure of the touch display device in the present application.
Figure 4:
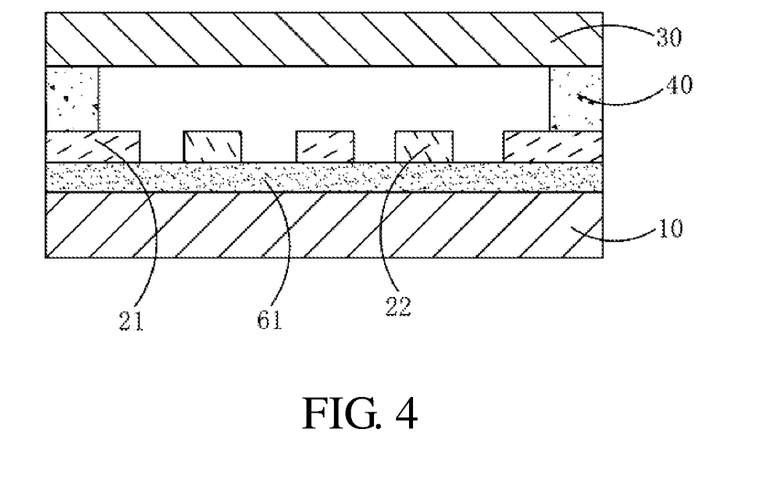
FIG. 4 is a structural schematic diagram of a fourth structure of the touch display device in the present application.

In one embodiment, as shown in FIG. 3, the touch layer 20 comprises a plurality of first electrodes 21 and a plurality of second electrodes 22 separated from each other, and the touch layer 20 is a self-capacitive touch layer or a mutual-capacitive touch layer.

Wherein the first electrodes 21 and the second electrodes 22 can be located in different layers, the second electrodes 22 are disposed on a side of the first electrodes 21 away from the display screen 10, at the same time, an insulating layer 23 can be disposed between the first electrodes 21 and the second electrodes 22.

Wherein as shown in FIG. 4, the first electrodes 21 can be disposed on a same layer as the second electrodes 22.

It should be noted that, when the touch layer 20 is the mutual-capacitive touch layer, one of the first electrode 21 and the second electrode 22 is a transmitting electrode, another one of the first electrodes 21 and the second electrode 22 is a receiving electrode, the first electrodes 21 and the second electrodes 22 form a touch capacity, and touch signals transmitted by the transmitting electrodes are received by the receiving electrodes. It can be configured as below: the transmitting electrodes transmit first touch signals when no touch operation is performed, when a touch operation is performed, a touch capacitance of a touch capacity formed by the first electrodes 21 and the second electrodes 22 of a position being touched changes, the transmitting electrodes transmit second touch signals, and a touch operation happens when the receiving electrodes receive the second touch signals.

It should be noted that, when the touch layer 20 is the self-capacitive touch layer, the first electrode 21 forms a touch capacity with a ground or a reference voltage line, the second electrode 22 forms a touch capacity with the ground or a reference voltage line. It can be configured as below: when a touch operation is performed, the first electrodes 21 and the second electrodes 22 transmit first touch signals, when a touch operation is performed, a touch capacitance of the touch capacity formed by the first electrodes 21 and the ground or the reference voltage line of a position being touched changes, a touch capacitance of the touch capacity formed by the second electrodes 22 and the ground or the reference voltage line of a position being touched changes, the first electrodes 21 and the second electrodes 22 transmit second touch signals to determine a touch position and a touch operation happens at the touched position.

Specifically, manufacturing materials of either the first electrodes 21, the second electrodes 22 or both include at least one of nano silver, transparent oxide semiconductor, or carbon nanotube.

Figure 5:
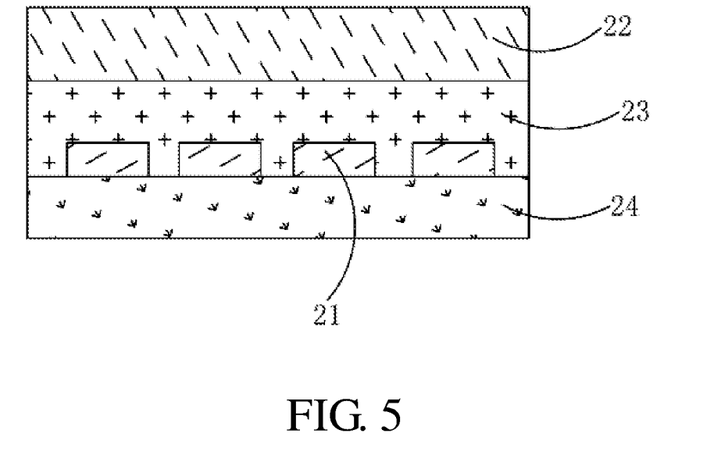
FIG. 5 is a structural schematic diagram of a touch layer in the present application.

As shown in FIG. 5, when the first electrodes 21 and the second electrodes 22 are located in different layers, the first electrodes 21 can extend along a first direction and a plurality of first electrodes 21 are arranged along a second direction, and the second electrodes 22 can extend along the second direction and a plurality of second electrode 22 are arranged along the first direction.

It should be noted that, when the touch layer 20 is the mutual-capacitive touch layer, the receiving electrodes can also be configured to have a network shape to increase touch sensitivity of the touch layer 20.

In one embodiment, the touch layer 20 further includes a base 24, when the first electrodes 21 and the second electrodes 22 are located in different layers, the first electrodes 21 are disposed on the base 24, and when the first electrodes 21 and the second electrodes 22 are located in a same layer, the first electrodes 21 and the second electrodes 22 are located on the base 24.

Wherein the base 24 can be a transparent plastic substrate. Manufacturing materials of the base 24 can be polyimide or polyester resin etc., and the base 24 can also be a transparent glass substrate.

Figure 6:
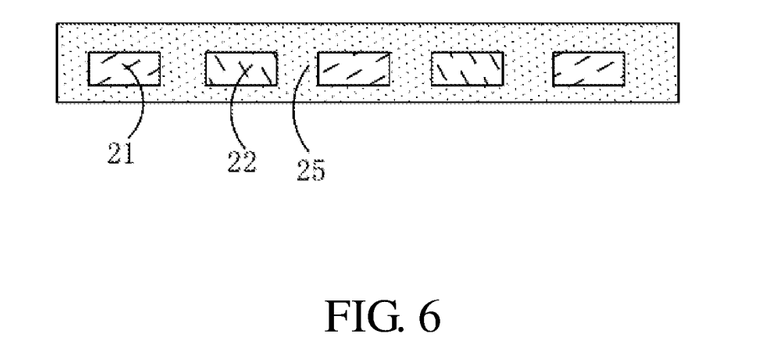
FIG. 6 is another structural schematic diagram of a touch layer in the present application.

In one embodiment, as shown in FIG. 6, the touch layer 20 further comprises a transparent membrane 25, the first electrodes 21 are disposed in the transparent membrane 25.

As shown in FIG. 7 to FIG. 11, the touch display device can further include an anti-glare layer disposed at a light exiting side of the display screen 10. The anti-glare layer is configured to scatter light emitted from the display screen 10 and external light to prevent glare of the touch display device from affecting users' experience.

Figure 7:
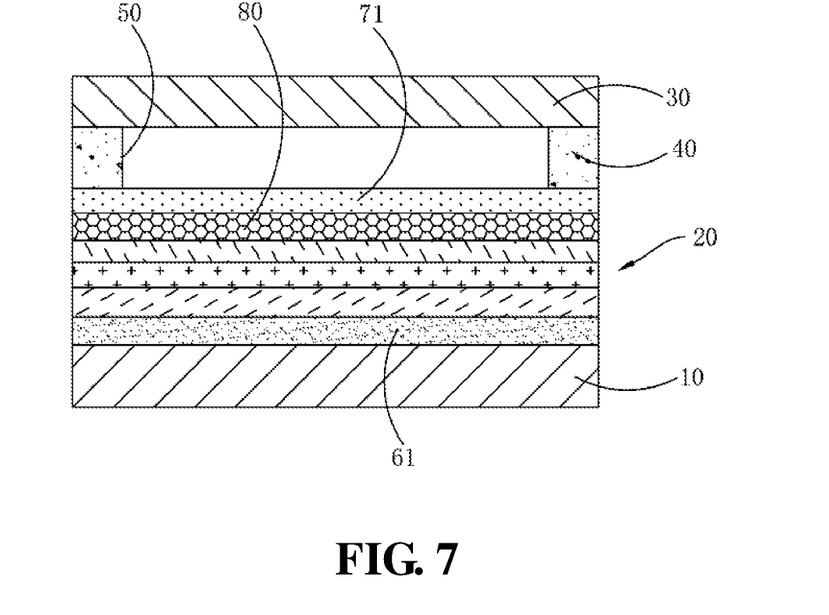
FIG. 7 is a structural schematic diagram of a fifth structure of the touch display device in the present application.
Figure 8:
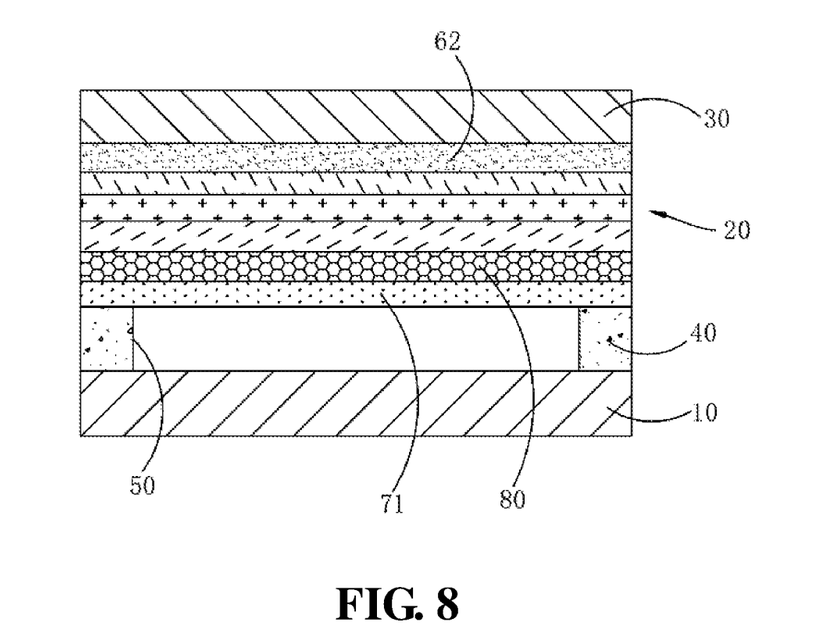
FIG. 8 is a structural schematic diagram of a sixth structure of the touch display device in the present application.
Figure 9:
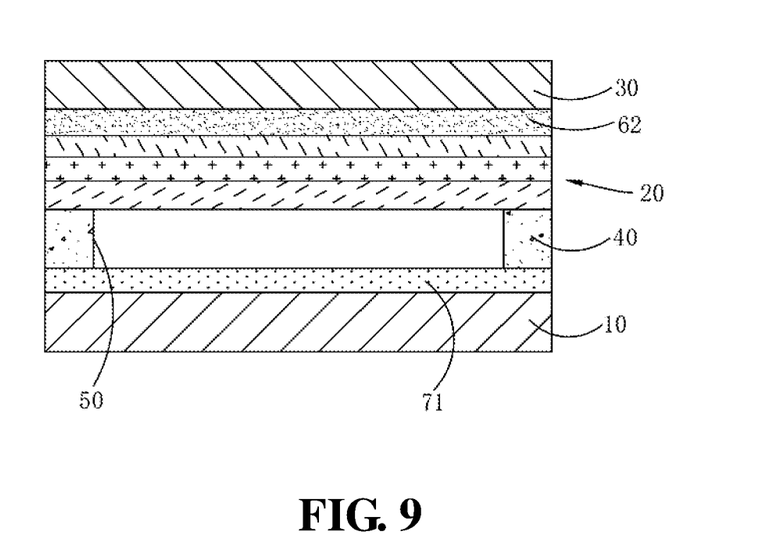
FIG. 9 is a structural schematic diagram of a seventh structure of the touch display device in the present application.

In one embodiment, as shown in FIG. 7 to FIG. 9, the anti-glare layer includes an anti-glare film 71.

As shown in FIG. 7 and FIG. 8, the anti-glare film 71 can be disposed either on a side surface of the touch layer 20 near, a side surface of the touch layer 20 away from the display screen 10 or both. The anti-glare film 71 is attached to the touch layer 20 using a transparent adhesive layer 80 by optical bonding.

As shown in FIG. 7, the anti-glare film 71 can be disposed on a side of the touch layer 20 away from the display screen 10. Under this circumstance, the sealant 40 and the sealed cavity 50 can be disposed between the encapsulation cover plate 30 and the anti-glare film 71.

As shown in FIG. 8, the anti-glare film 71 can also be disposed on a side of the touch layer 20 close to the display screen 10. Under this circumstance, the sealant 40 and the sealed cavity 50 can be disposed between the display screen 10 and the anti-glare film 71.

As shown in FIG. 9, the anti-glare film 71 can also be disposed on a side of the display screen 10 close to the touch layer 20. Under this circumstance, the sealant 40 and the sealed cavity 50 can be disposed between the touch layer 20 and the anti-glare film 71.

Figure 10:
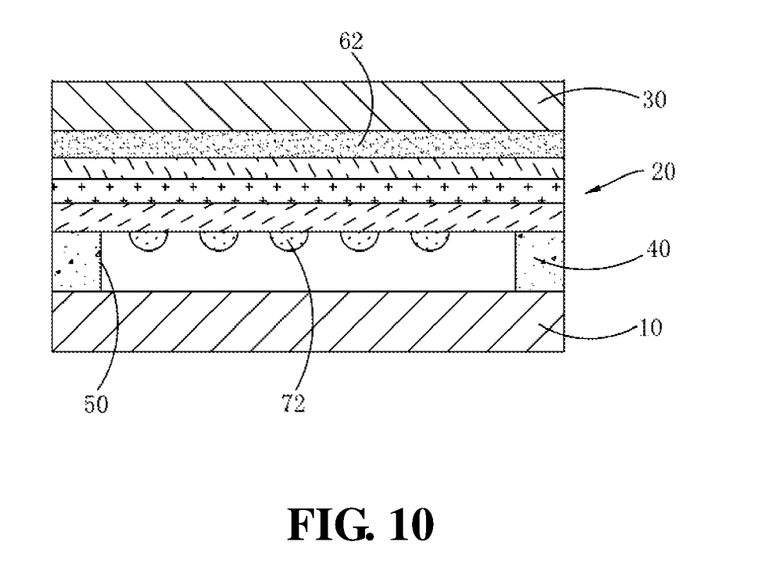
FIG. 10 is a structural schematic diagram of a eighth structure of the touch display device in the present application.
Figure 11:
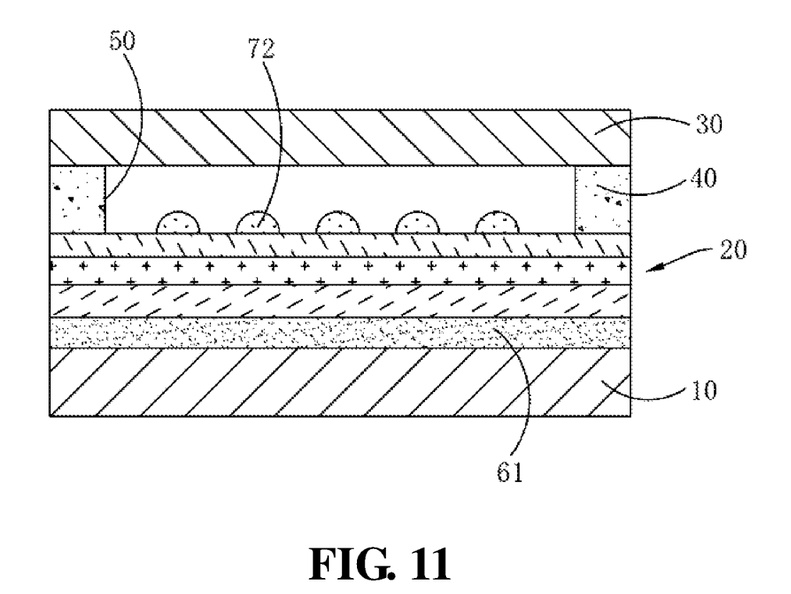
FIG. 11 is a structural schematic diagram of a ninth structure of the touch display device in the present application.

In one embodiment, as shown in FIG. 10 to FIG. 11, the anti-glare layer includes a plurality of scattering particles 72 disposed on the touch layer 20, the scattering particles 72 configured to scatter light emitted from the display screen 10 and external light.

As shown in FIG. 10, the scattering particles 72 can be disposed on a side of the touch layer 20 close to the display screen 10. Under this circumstance, the sealant 40 and the sealed cavity 50 can be disposed between the touch layer 20 and the display screen 10. The scattering particles 72 are located in the sealed cavity 50 to decrease an overall thickness of the touch display device.

As shown in FIG. 11, the scattering particles 72 can also be disposed on a side of the touch layer 20 away from the display screen 10. Under this circumstance, the sealant 40 and the sealed cavity 50 can be disposed between the touch layer 20 and the encapsulation cover plate 30. The scattering particles 72 are located in the sealed cavity 50 to decrease an overall thickness of the touch display device.

Figure 12:
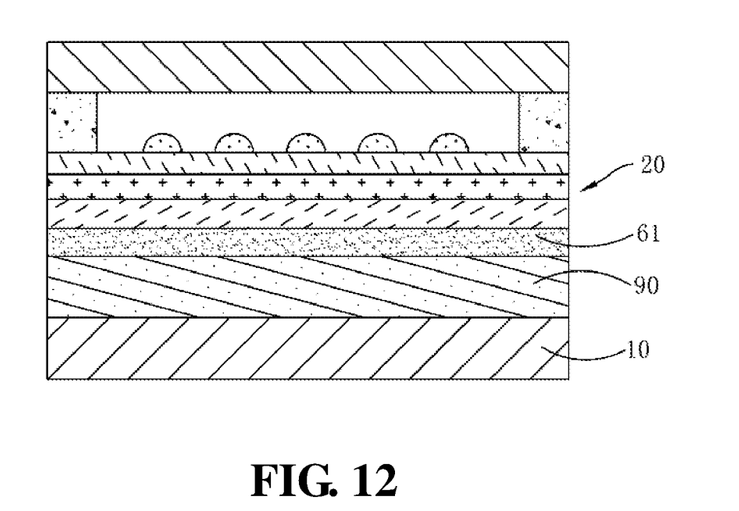
FIG. 12 is a structural schematic diagram of a tenth structure of the touch display device in the present application.

In one embodiment, as shown in FIG. 12, an optical adhesive layer 90 can also be disposed between the touch layer 20 and the display screen 10. The optical adhesive layer 90 is configured to increase a surface evenness of the display screen 10 so that the touch layer 20 can fit on the display screen 10 smoothly.

Advantageous effects of the present application are as below: a pressure difference between the sealed cavity 50 and external atmospheric pressure is utilized to reduce a gap value of the sealed cavity 50, simultaneously, the gap value of the sealed cavity 50 always remains constant during use of the touch display device, and linearity and sensitivity of touch function of the touch display device meeting product requirements can be ensured.

In the above embodiments, description of each embodiment has its own emphasis. For part with no detailed description in one embodiment, please refer to relevant description of other embodiments.

Specifically, examples are used to illustrate principles and embodiments of the present application. The description of the above embodiments is only intended to help understand the technical schemes and core concepts of this disclosure. It is noted that those with ordinary skill in the technique field could make various modifications to technical schemes or equivalent replacements to part of the technical features described in embodiments above-mentioned, and these modifications and replacement don't make the substantial of corresponding technical schemes out of the scope of technical schemes of embodiments of the present application.

What is claimed is:

1. A touch display device, comprising:
    a display panel, comprising a display screen and an encapsulation cover plate disposed on a light-exiting side of the display screen;
    a touch layer, disposed between the display screen and the encapsulation cover plate; and
    a sealant disposed between the touch layer and the encapsulation cover plate;
    wherein the sealant, the touch layer, and the display panel form a sealed cavity, and an air pressure intensity inside the sealed cavity is less than a preset value, a first adhesive layer is disposed between the touch layer and the display screen, the first adhesive layer is connected with the touch layer and the display screen, and an orthographic projection on the encapsulation cover plate of the first adhesive layer covers an orthographic projection on the encapsulation cover plate of a surface of the display screen.

2. The touch display device of claim 1, wherein the air pressure intensity inside the sealed cavity is less than 0.1 Torr.

3. The touch display device of claim 2, wherein a thickness of the sealed cavity is less than a thickness of the sealant.

4. The touch display device of claim 2, and a thickness of the sealant is less than 20 microns.

5. The touch display device of claim 4, wherein the touch layer comprises a plurality of first electrodes and a plurality of second electrodes separated from each other, and the touch layer is a self-capacitive touch layer or a mutual-capacitive touch layer.

6. The touch display device of claim 5, wherein the second electrodes are disposed on a side of the display screen away from the first electrode, or the first electrodes are disposed on a same layer as the second electrodes.

7. The touch display device of claim 5, wherein manufacturing materials of either the first electrodes, the second electrodes, or both comprise at least one of nano silver, transparent oxide semiconductor, or carbon nanotubes.

8. The touch display device of claim 5, wherein the touch display device further comprises an anti-glare layer disposed on the light-exiting side of the display screen.

9. The touch display device of claim 8, wherein the anti-glare layer comprises an anti-glare film disposed on the touch layer, and the touch layer is disposed either on a side surface of the touch layer away from, a side surface of the touch layer near the display screen, or both.

10. The touch display device of claim 8, wherein the anti-glare layer comprises a plurality of scattering particles disposed on the touch layer.

11. A touch display device, comprising:
    a display panel, comprising a display screen and an encapsulation cover plate disposed on a light-exiting side of the display screen;
    a touch layer, disposed between the display screen and the encapsulation cover plate; and
    a sealant disposed between the touch layer and the display screen;
    wherein the sealant and the sealed cavity are disposed between the touch layer and the display screen, a first adhesive layer is disposed between the touch layer and the encapsulation cover plate, the first adhesive layer is connected with the touch layer and the encapsulation cover plate, and an orthographic projection on the encapsulation cover plate of the first adhesive layer covers an orthographic projection on the encapsulation cover plate of a surface of the touch layer.

12. The touch display device of claim 11, wherein the air pressure intensity inside the sealed cavity is less than 0.1 Torr.

13. The touch display device of claim 12, and a thickness of the sealant is less than 20 microns.

14. The touch display device of claim 11, wherein the touch layer comprises a plurality of first electrodes and a plurality of second electrodes separated from each other, and the touch layer is a self-capacitive touch layer or a mutual-capacitive touch layer.

15. The touch display device of claim 14, wherein the second electrodes are disposed on a side of the display screen away from the first electrode, or the first electrodes are disposed on a same layer as the second electrodes.

16. The touch display device of claim 14, wherein manufacturing materials of either the first electrodes, the second electrodes, or both comprise at least one of nano silver, transparent oxide semiconductor, or carbon nanotube.

17. The touch display device of claim 14, wherein the touch display device further comprises an anti-glare layer disposed on the light-exiting side of the display screen.

18. The touch display device of claim 17, wherein the anti-glare layer comprises an anti-glare film disposed on the touch layer, and the touch layer is disposed either on a side surface of the touch layer away from, a side surface of the touch layer near the display screen, or both.

19. The touch display device of claim 18, wherein the anti-glare layer comprises a plurality of scattering particles disposed on the touch layer.

\* \* \* \* \*